March 2, 1943.  G. H. BAUER  2,312,377
TRUCK
Filed Feb. 5, 1941   2 Sheets-Sheet 1

Inventor:
GEORGE H. BAUER,
by John E. Jackson
his Attorney.

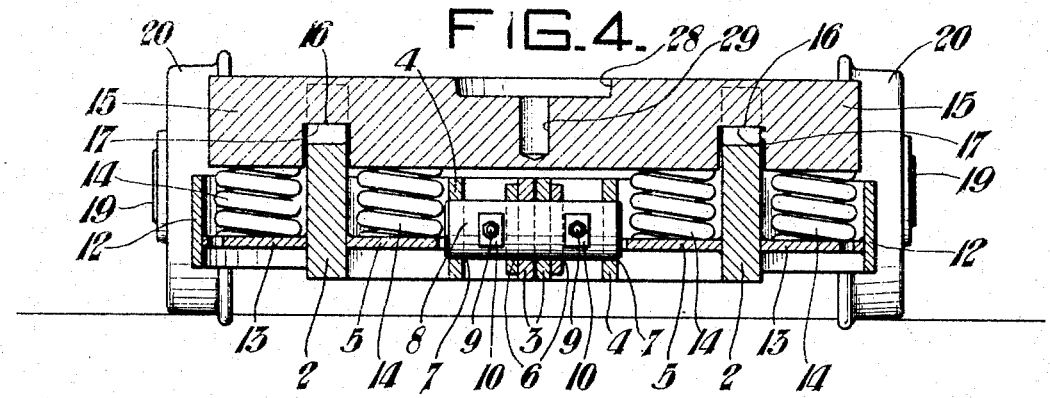
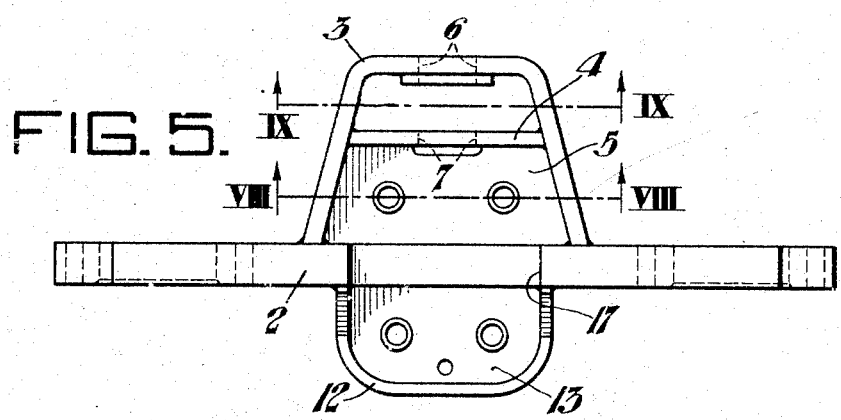
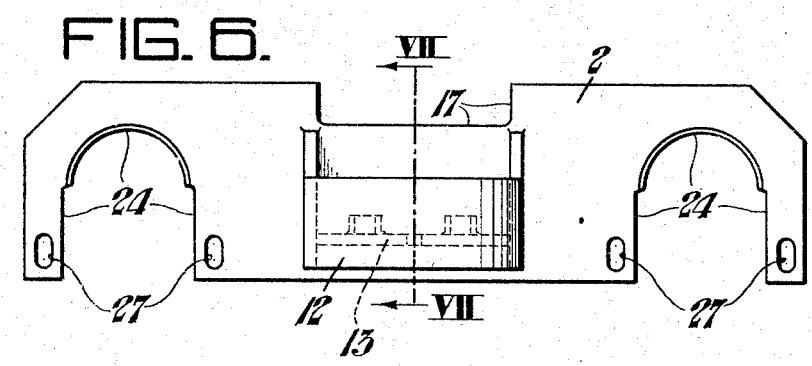
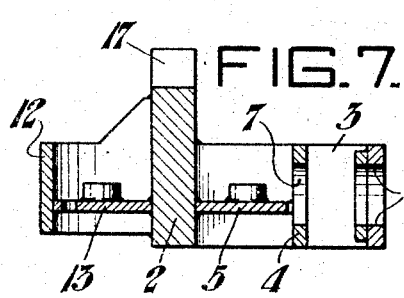
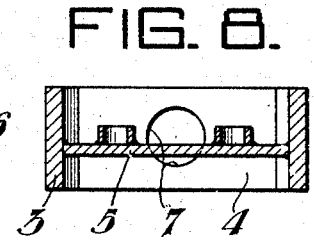
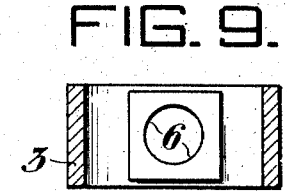

Patented Mar. 2, 1943

2,312,377

UNITED STATES PATENT OFFICE 2,312,377

TRUCK

George H. Bauer, Gary, Ind.

Application February 5, 1941, Serial No. 377,561

6 Claims. (Cl. 105—182)

This invention relates to trucks, and particularly to an improved car or truck which is especially adaptable for use in connection with a car for transporting ingot molds or other heavy objects in the steel industry.

While many cars or trucks have been suggested for use in transporting ingot molds, charging boxes, and other heavy objects and articles from one point to another in a steel manufacturing plant, most of them have been unsatisfactory, primarily for the reason that any load placed thereon was not evenly distributed on all of the wheels. Also, such trucks or cars in most cases were not designed or constructed so as to compensate for any irregularities in the surface traversed by trucks during their use. Consequently, in such cases the trucks were not only difficult to move from one point to another, but the movement of the trucks was a hazard to the workmen along the route thereof in that the body of the trucks at times became uneven and unbalanced, due to the position of the load thereon, which would oftentimes result in an overturning of the truck. This, of course, was unsatisfactory and dangerous to the workmen and resulted in damage and sometimes serious injury.

Accordingly, it is one of the objects of the present invention to provide an improved truck for transporting ingot molds and the like in which any load placed thereon and carried thereby is uniformly distributed throughout all of the wheels of the truck and, at the same time, a truck which will accommodate itself to the irregularities of the surface over which it traverses, whereby the body thereof will be maintained substantially level at all times thereby eliminating the above-named disadvantages.

It is another object of the invention to provide an improved truck for transporting ingot molds and the like which is simple and inexpensive in its construction, and yet one which is strong and rugged.

It is a further object of this invention to provide an improved truck for transporting ingot molds and the like which can be easily and conveniently assembled and dismantled, and one consisting of a minimum number of parts.

Various other objects and advantages of this invention will more fully appear during the course of the following specification and will be particularly pointed out in the appended claims.

In the accompanying drawings, there is shown for the purpose of illustration an embodiment which my invention may assume in practice.

In these drawings:

Figure 4 is a section taken on line IV—IV of Figure 2;

Figure 5 is a plan view of one of the side sills of the truck, together with the parts associated therewith;

Figure 6 is a side elevation of the side sill shown in Figure 5;

Figure 7 is a section taken on line VII—VII of Figure 6;

Figure 8 is a section taken on line VIII—VIII of Figure 5; and

Figure 9 is a section taken on line IX—IX of Figure 5.

Figure 1:
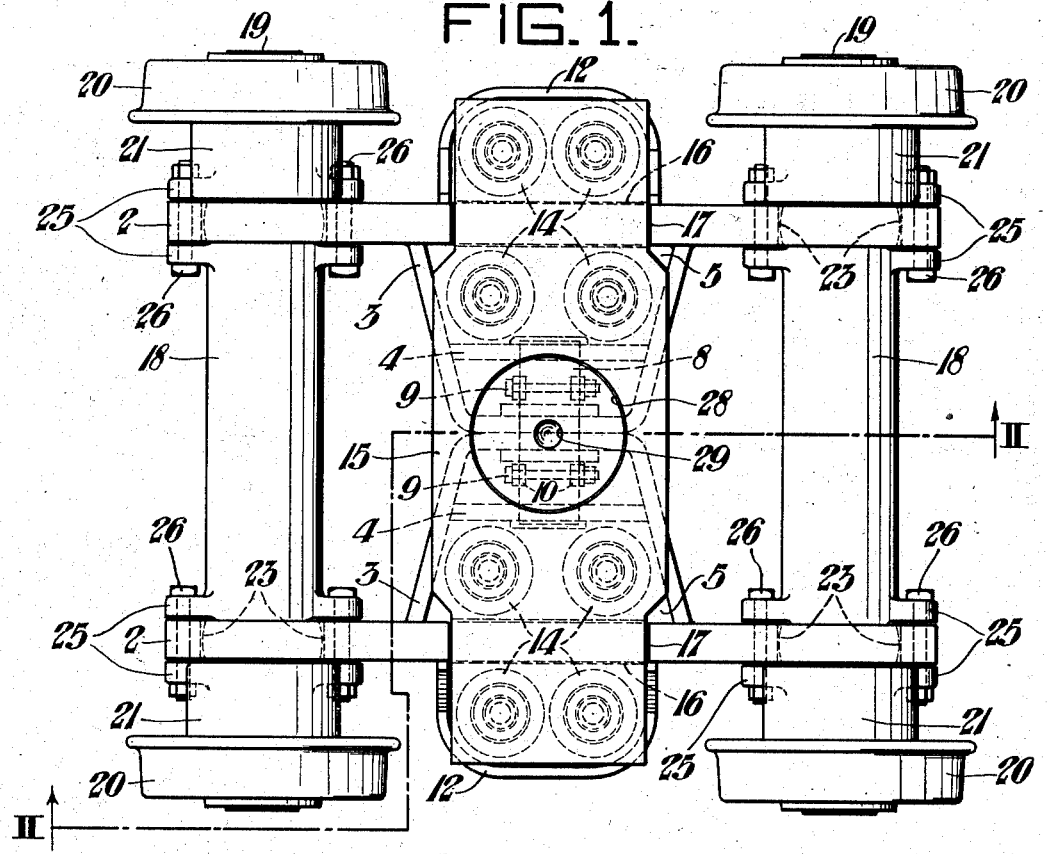
Figure 1 is a plan view of the improved truck of my invention.

Referring more particularly to the drawings, the improved truck of my invention comprises a pair of spaced apart side sill members 2 with each consisting preferably of a vertically arranged plate-like member. Each of the side sills has arranged, substantially centrally thereof on the inner side of the same, an inwardly extending U-shaped bracket member 3 having the ends of the legs thereof preferably welded to the inner side of their respective side sills, as is clearly shown in Figures 5 through 9 of the drawings. Within each of the U-shaped bracket members 3 there is preferably arranged across the same a partition plate 4 which is preferably welded to the oppositely disposed legs of the U-shaped bracket. There is also disposed preferably within each of the U-shaped brackets 3 a plate-like spring seating member 5 which is also preferably welded in position.

In the inner side of each of the U-shaped brackets 3, substantially centrally thereof, there is arranged a cylindrical opening or hole 6 with the holes in each being in alignment with each other, and there is also arranged in each of the partition plates 4, substantially centrally thereof, a corresponding opening or hole 7 which holes are in alignment with each other and with the holes 6 in the brackets 3. There is positioned in and extending through the aligned holes 6 and 7 a pin member 8 which is adapted to hold the U-shaped bracket members 3, together with the side sills 2 to which they are attached, in engagement with each other. The pin 8 is held in position in the holes 6 and 7 and between the bracket members, preferably by means of a pair of bolts 9 disposed in openings arranged through the pin, with each positioned preferably within and adjacent the inner side of the outer end of the bracket member on the outer side of the partition plate 4. As shown in Figures 1 and 4, there is provided with each of the bolts 9 preferably a square washer or keeper 10 which is adapted to hold the outer sides of the brackets 3 firmly in contact with each other so as to prevent any lost motion therebetween.

Thus, it will be understood that it is the purpose of the pin 8, together with the bolts 9 and washers 10 carried thereby, to maintain the outer sides of the bracket members 3 in contact with each other at all times substantially on the center line of the truck. By means of such a construction, it will be seen that the side sills ar permitted to turn on the pin 8 relative to each other in a vertical plane, but are secured against any movement relative to each other in a horizontal plane.

There is also arranged on the outer side of each of the side sills 2, substantially in the center thereof at a point directly opposite the U-shaped bracket 3, preferably a smaller U-shaped bracket member 12 which likewise has the inner ends of the legs thereof preferably welded to the side of the respective side sill. There is also disposed within each of the U-shaped brackets 12 preferably a plate-like spring seating member 13 which is also held in place preferably by means of welding.

There is positioned on each of the plate-like spring seats 5 and 13 a plurality of vertically arranged coil springs 14. On top of the coil springs 14 there is disposed a bolster plate 15 having a pair of rectangular-shaped grooves or slots 16 arranged in the lower face thereof, which are spaced apart substantially the same distance that the side sills 2 are spaced from each other. The bolster plate 15 is adapted to lie across the side sills and is disposed in openings 17 arranged centrally of each of the side sills, which openings are preferably made by cutting away a portion of the top edge of each of the side sills as shown in Figures 5 and 6. Each of the slotted openings 16 has a width slightly greater than the width of the plate-like side sills 2, which are disposed therein, so that the bolster plate straddles the side sills, as shown in Figure 4 of the drawings. It will be understood that the bolster plate 15 is supported by the coil springs 14 and the side sill members 2, and that the slots 16 of the bolster plate cooperate with the side sills so as to guide the bolster plate in its yieldable vertical movement and also to prevent any lateral movement of the bolster plate relative to the side sills and the truck.

Figure 3:
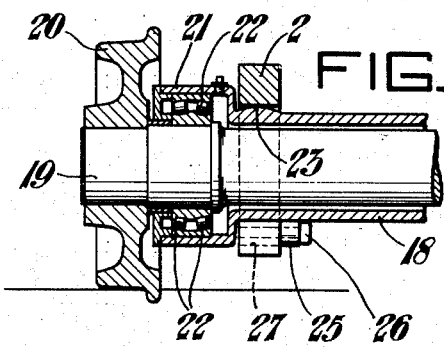
Figure 3 is a section taken on line III—III of Figure 2.

There is provided a pair of journal and axle housings 18, through each of which there is arranged an axle 19 having a wheel 20 securely arranged on each end thereof. Each of the housings 18 has arranged on each end thereof preferably an enlarged housing portion 21 in which there is disposed preferably a conventional type anti-friction bearing 22. There is arranged on the top side of each of the housings 18, immediately on the inside of the bearing housing portions 21, an arcuate-shaped or crowned portion 23 which is disposed in a plane axially of the housing 18, as shown in Figure 3 of the drawings, the purpose of which will be hereinafter described.

Figure 2:
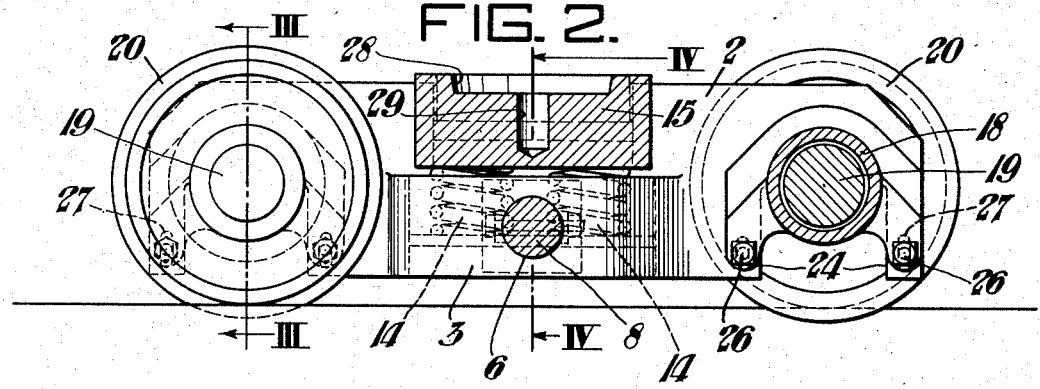
Figure 2 is a section taken on line II—II of Figure 1.

There is arranged in the lower side of each of the side sill members 2 a pair of spaced apart inverted U-shaped openings 24 with one arranged adjacent each end of the side sills, as shown in Figure 6. The side sill members are adapted to fit over each of the housings 18 with the housings arranged in the openings 24 so that the side sills straddle the housings 18. The top side of each of the openings 24 rests upon the respective arcuate-shaped or crowned portions 23 arranged on the top of the housings, thus forming a modified ball and socket bearing. The lower side of each of the side sills, adjacent the openings 24 therein, is adapted to fit between a pair of lugs or outwardly protruding portions 25 arranged to either side of each of the housings 18, adjacent the lower side thereof and at each end thereof, as shown in Figures 1 and 2 of the drawings. There is arranged in and extending through openings, arranged in each of the lugs 25, a bolt 26 which also extends through an aligned slotted hole 27 disposed in the side sills at the bottom side thereof adjacent the openings 24 and to either side thereof. The lugs 25 hold the side sills in vertical alignment with the journal housings and the bolts 26 maintain the side sills in engagement with the housings. However, it will be seen that each of the side sills has a limited vertical movement relative to each of the housings 18, due to the fact that each of the bolts 26 is disposed in slotted openings 27 carried by the side sills.

It will be understood that the truck itself may be used for transporting articles, or two trucks might be used with a body member carried thereby and arranged therebetween, similarly to a railroad car. In such a case, the top of the bolster plate 15 is preferably cylindrically recessed as at 28, substantially in the center thereof, having a hole 29 concentrically aranged therewith in which a king-pin and bearing on the car or truck body is adapted to be positioned so as to provide horizontal rotary movement of the truck relative to the car body when passing around curves or in accommodating the movement of the truck over horizontal irregularities in the track or route of the car.

As a result of my invention, it will be seen that the combination of the side sills resting on the arcuate-shaped or crowned bearing portions 23 of the housings 18, the slotted openings 27 in the side sills, and the pivotal connection of the brackets 3 by means of the pin 8 provide a construction whereby the wheels may accommodate themselves to any irregularities in the path or route being traversed by the truck, while at the same time the car or truck body will maintain substantially a level position with the members or parts of the truck maintaining proper angular alignment with each other at all times. Furthermore, it will be seen that the truck of my invention is so constructed that any twisting of the same is entirely eliminated, but at the same time there is provided a truck which is relatively flexible so that the wheels are movable to a limited extent relative to the body of the truck and to each other, which is a decided advantage.

Another important aspect of the truck of the present invention is that it can be easily and quickly assembled and dismantled. It will be understood that the journal housings, together with the axles and wheels arranged with each of them, can be removed from the truck merely by removing the bolts 26. After the bolster plate 15, together with the coil springs 14, have been lifted from position on the top of the truck, the two halves of the truck—namely, the side sills 2, together with the brackets carried thereby, can then be taken apart by removing one or both of the bolts 9 inserted through the pin 8. Thereafter, each of the journal housing assemblies can be taken apart by forcing either one of the wheels 20 off the end of the axle.

While I have shown and described one specific embodiment of my invention, it will be understood that this embodiment is merely for the purpose of illustration and description and that various other forms may be devised within the scope of my invention, as defined in the appended claims.

I claim:

1. A truck of the class described comprising a pair of spaced apart plate-like side sill members, an inwardly extending bracket member arranged on the inner side of each of said side sill members substantially centrally thereof, each of said bracket members having the outer end thereof attached to its respective side sill member, said bracket members having aligned holes arranged in the inner opposed sides thereof centrally of said truck, a removable pin arranged between said bracket members through said aligned holes for holding the side sill members pivotally in engagement with each other, a plurality of vertically arranged coil springs mounted on said bracket members on the inner side of each of said side sill members, a bolster plate mounted on said coil springs for vertical movement relative to said sill members, means for guiding said bolster plate in its vertical movement relative to said sill members, each of said side sill members having a corresponding inverted U-shaped opening arranged in the lower side thereof adjacent each end of the same, a pair of journal housings with one arranged in the oppositely disposed corresponding U-shaped openings of said sill members and extending therebetween, each of said journal housings having an arcuate-shaped portion arranged in an axial direction on the top side thereof directly opposite each of said U-shaped openings upon which the side sill members rest at the inner side of said openings, and an axle arranged through each of said journal housings having a wheel arranged on each end for supporting the truck.

2. A truck of the class described comprising a pair of spaced apart plate-like side sill members, an inwardly extending U-shaped bracket member arranged on the inner side of each of said side sill members substantially centrally thereof, each of said bracket members having the ends of the leg portions thereof attached to its respective side sill member, said bracket members having aligned holes arranged in the inner opposed sides thereof centrally of said truck, a removable pin arranged through the aligned holes in said bracket members for holding the said sill members pivotally in engagement with each other, a plurality of vertically arranged coil springs mounted on said bracket members on the inner sides of said side sill members, a bolster plate mounted on said coil springs for vertical movement relative to said sill members, means for guiding said bolster plate in its vertical movement relative to said side sill members, each of said side sill members having a corresponding inverted U-shaped opening arranged in the lower side thereof adjacent each end of the same, a pair of journal housings with one arranged in the oppositely disposed corresponding U-shaped openings of said sill members and extending therebetween, each of said journal housings having an arcuate-shaped portion arranged in an axial direction on the top side thereof directly opposite each of said U-shaped openings upon which the side sill members rest at the inner side of said openings, and an axle arranged through each of said journal housings having a wheel arranged on end thereof for supporting the truck.

3. A truck of the class described comprising a pair of spaced apart side sill members, a removable pin arranged between said sill members substantially centrally thereof for holding them in engagement with each other, a plurality of vertically arranged coil springs mounted on both of said side sill members substantially centrally thereof and opposite said pin, a bolster plate arranged on said coil springs substantially perpendicular to said side sill members and for limited vertical movement relative thereto, each of said side sill members having a slotted opening arranged therein substantially centrally thereof in which said bolster plate is disposed to said bolster plate having a slotted opening arranged in the lower side thereof at points directly opposite each of said side sill members in which the upper sides of the respective side sill members are disposed so as to provide a guiding means for the bolster plate in its vertical movement, and a pair of axles arranged between said side sill members having wheels aranged on each end thereof for supporting the truck.

4. A truck of the class described comprising a pair of spaced apart side sill members, an inwardly extending substantially U-shaped bracket member arranged on the inner side of each of said side sill members substantially centrally thereof, each of said bracket members having the ends of the leg portions thereof attached to its respective side sill member, said bracket members having aligned holes arranged in the opposed inner sides thereof centrally of said truck, a plate-like member arranged within and across each of said bracket members at a spaced distance from the inner sides of said bracket members and substantially parallel thereto, said plate-like members having similar holes arranged therethrough which are disposed in alignment with the holes in said bracket members, a pin member arranged through the aligned holes in said bracket and plate-like members for holding the side sill members pivotally in engagement with each other, a plurality of coil springs mounted on said bracket members on the inner sides of each of said side sill members, a bolster mounted on said coil springs for limited vertical movement, and a pair of axles arranged between said side cell members having wheels arranged on each end thereof for supporting the truck.

5. A truck of the class described comprising a pair of spaced apart side sill members, an inwardly extending substantially U-shaped bracket member arranged on the inner side of each of said side sill members substantially centrally thereof each of said bracket members having the ends of the leg portions thereof attached to its respective side sill member, said bracket members having aligned holes arranged in the opposed inner sides thereof centrally of said truck, a plate-like member arranged within and across each of said bracket members at a spaced distance from the inner sides thereof and substantially parallel thereto, said plate-like members having similar holes arranged therethrough which are disposed in alignment with the holes in said bracket members, a pin member arranged through the aligned holes in said bracket and plate-like members for holding the side sill members pivotally in engagement with each other, a plurality of coil springs arranged on said bracket members on the inner sides of said side sill members, a plurality of similar coil springs carried by said side sill members on the outer sides thereof, a bolster mounted on said coil springs for vertical movement relative to said side sill members, and a pair of axles arranged between said sill members having wheels arranged on each end thereof for supporting the same.

6. A truck of the class described comprising a pair of spaced apart side sill members, an inwardly extending substantially U-shaped bracket member arranged on the inner side of each of said side sill members substantially centrally thereof, each of said bracket members having the ends of the leg portions thereof attached to its respective side sill member, said bracket members having aligned holes arranged in the opposed inner sides thereof centrally of said truck, a plate-like member arranged within and across each of said bracket members at a spaced distance from the inner sides of said bracket members and substantially parallel thereto, said plate-like members having similar holes arranged therethrough which are disposed in alignment with the holes in said bracket members, a pin member arranged through the aligned holes in said bracket and plate-like members for holding the side sill member pivotally in engagement with each other, a plurality of vertically aranged coil springs mounted on said bracket members on the inner sides of said side sill members, a bolster mounted on said coil springs for vertical movement relative to said sill members, each of said side sill members having an opening arranged therein adjacent the top thereof in which said bolster is disposed with the side walls of said openings adapted to guide said bolster in its vertical movement relative to said side sill members, and a pair of axles arranged between said sill members having wheels arranged on each end thereof for supporting the same.

GEORGE H. BAUER.

CERTIFICATE OF CORRECTION.

Patent No. 2,312,377.                               March 2, 1943.

GEORGE H. BAUER.

It is hereby certified that error appears in the printed specification of the above numbered patent requiring correction as follows: Page 2, first column, line 17, for "ar" read --are--; and second column, line 37, for "aranged" read --arranged--; line 72, for "have been" read --has been--; page 3, second column, line 5, claim 2, after "on" insert --each--; line 20, claim 3, for "to said" read --and said--; line 28, same claim, for "aranged" read --arranged--; line 55, claim 4, for "cell" read --sill--; page 4, first column, line 3-4, claim 5, for "simlar" read --similar--; and second column, line 7-8, claim 6, for "member" read --members--; and that the said Letters Patent should be read with this correction therein that the same may conform to the record of the case in the Patent Office.

Signed and sealed this 24th day of April, A. D. 1945.

Leslie Frazer (Seal)                              Acting Commissioner of Patents.